United States Patent
Bailey et al.

(10) Patent No.: US 9,220,249 B1
(45) Date of Patent: Dec. 29, 2015

(54) AQUATIC ANIMAL RETRIEVAL DEVICE

(71) Applicants: Barry Bailey, Hudson, FL (US); Lisa Bailey, Hudson, FL (US)

(72) Inventors: Barry Bailey, Hudson, FL (US); Lisa Bailey, Hudson, FL (US)

( * ) Notice: Subject to any disclaimer, the term of this patent is extended or adjusted under 35 U.S.C. 154(b) by 147 days.

(21) Appl. No.: 14/227,056

(22) Filed: Mar. 27, 2014

(51) Int. Cl.
*A01K 91/02* (2006.01)
*A01K 81/00* (2006.01)

(52) U.S. Cl.
CPC ............ *A01K 91/02* (2013.01); *A01K 81/00* (2013.01)

(58) Field of Classification Search
CPC ....... A01K 81/00; A01K 81/04; A01K 81/06; A01K 89/0111; A01K 91/02
USPC ................... 43/4, 6, 19, 22, 25, 43.11, 43.15; 473/575
See application file for complete search history.

(56) References Cited

U.S. PATENT DOCUMENTS

| | | | | |
|---|---|---|---|---|
| 1,469,883 A | * | 10/1923 | Brakers | A01K 91/02 124/26 |
| 2,421,466 A | | 6/1947 | Schenavar | |
| 3,059,370 A | * | 10/1962 | Moore | A01K 91/02 124/23.1 |
| 3,392,473 A | * | 7/1968 | Dietsch | A01K 91/02 124/27 |
| 3,425,151 A | * | 2/1969 | Salfer | A01K 93/00 43/43.11 |
| 3,500,571 A | * | 3/1970 | Jangala, Sr. | A01K 91/02 43/19 |
| 4,024,667 A | | 5/1977 | Wegener | |
| 4,378,781 A | * | 4/1983 | Shiflett | F41B 5/1488 124/23.1 |
| 5,119,579 A | | 6/1992 | Hullihen et al. | |
| 5,609,147 A | * | 3/1997 | Withorn, Jr. | F41B 5/1488 124/86 |

* cited by examiner

*Primary Examiner* — Darren W Ark
*Assistant Examiner* — Danielle Clerkley
(74) *Attorney, Agent, or Firm* — Crossley Patent Law

(57) ABSTRACT

An aquatic animal retrieval device having an L-shaped mount, the mount configured for attachment to an existing crossbow, a V-shaped spool connected to the mount, a shaft attached to the mount, the shaft extended forwardly from the crossbow, a float slidably disposed on the shaft, the float removably attached to the mount, an arrow removably disposed in the crossbow, the arrow having a barbed point disposed on the first end and a notch disposed in the second end, the notch configured to removably accept a drawstring of the crossbow, a line affixed to the arrow and the float wherein the to float is configured to travel with the arrow upon release of the arrow from the crossbow.

7 Claims, 6 Drawing Sheets

AQUATIC ANIMAL RETRIEVAL DEVICE

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

Various types of animal retrieval devices are known in the prior art. However, what is needed is an aquatic animal retrieval device for attachment to an existing crossbow to retrieve aquatic game that might otherwise be difficult and sometimes even impossible to successfully retrieve.

Aquatic animals can be difficult to retrieve once caught, and especially alligators. An alligator, as further example of difficulty in game retrieval, are often hunted for various reasons, and among those reasons is game pursuit. However, should an alligator be captured, hooked with baited hook as is often the case, harvesting that alligator can be quite difficult. Oftentimes gaffs and spears and the like are used but are not easy to use, require significant strength, and also can easily result in lost game. Some have used devices incorporated into archery bows yet such devices have more easily experienced tangling lines and bowstrings than have crossbows. Also, use of an archery bow requires significant strength not always available to a user.

If sufficient arrow shaft velocity is required in successful retrievals, that same strength requirement negates use by some, a negation avoided in crossbows. Convenience and maneuvering space are also concerns with an archery bow as opposed to a crossbow. Still, crossbow retrieval can be problematic. An arrow can be attached to the crossbow via a line, but entanglement of the line is a serious issue, whether the line entangling with itself, the arrow to which it is attached, or to various components of the crossbow. The design of a device that is used with a crossbow is therefore critical. Additionally, locating the approximate position of the game whether alligator or other when shot with a crossbow can be quite difficult. The present aquatic animal retrieval device solves these problems.

FIELD OF THE INVENTION

The present invention relates to animal retrieval devices, and more particularly, to an aquatic animal retrieval device that can be used for retrieving a plurality of various aquatic creatures.

SUMMARY OF THE INVENTION

The general purpose of the invention, described subsequently in greater detail, is to provide an aquatic animal retrieval device that has many novel features that result in the aquatic animal retrieval device that is not anticipated, rendered obvious, suggested, or even implied by prior art, either alone or in combination thereof.

To accomplish this, the present aquatic animal retrieval device includes a device that attaches to a crossbow and provides for locating and retrieving various aquatic animals. The device includes a mount. The mount can be an L-shaped mount having an upper leg connected to a lower leg by a bend. The bend can be 90 degrees. The bend can also be provided in various angular attachments of the upper leg and the lower leg. The upper leg is configured for attachment to an existing crossbow via fasteners. The upper leg can also be attached to the crossbow via adhesives or bonding and in an original crossbow production configuration.

The V-shaped spool provided has an inner angle connected to an outer angle by a well. The inner angle can be identical to the outer angle. The outer angle can also have an outer angle diameter greater than an inner angle diameter of the inner angle. The inner angle can be removably attached to the lower leg via fasteners or other techniques. The inner angle can be flanged for attachment. A shaft can be attached perpendicularly to the lower leg. The shaft is extended forwardly from the crossbow, most distal to a handle of the crossbow. A float is provided. The float has an orifice that is slidably disposed on the shaft. A hook and loop removably attaches the float to the lower leg so that the float is retained upon the shaft until being pulled away by the line attached to the arrow. This feature is important in order to prevent inadvertent release of the float from the shaft and also to prevent line entanglement and further to enable float release without undue arrow drag.

An arrow is provided. The arrow is removably disposed in the crossbow. The arrow comprises a first end spaced apart from a second end. A barbed point is disposed on the first end. A notch is disposed in the second end, the notch configured to removably accept a drawstring of the crossbow. A loop is disposed within the first end. The loop can be disposed only within the first end. The loop can be disposed only within the barbed point. The loop can be disposed through both the barbed point and the first end and thereby further ensure barbed point attachment to the first end. An opening is disposed in the arrow. The opening is most proximal to the second end. A fletch is disposed within the arrow. The fletch is disposed most proximal to the opening. The fletch is disposed between the opening and the first end.

A line is passed through the orifice and anchored to float. The line is wrapped around the well. The line is passed through the opening and anchored to the loop; wherein the float is configured to remain with the arrow upon release from the crossbow. The design of the device, and specifically the outer angle and the well, the line attachment to the float, the line passage through the opening and the line attachment to the loop can be critical to non-tangling line function of the device in cooperation with the crossbow. The loop can be a part of the barbed point and the arrow most proximal to the first end and therein ensure barbed point retention.

Thus has been broadly outlined the more important features of the present aquatic animal retrieval device so that the detailed description thereof that follows may be better understood and in order that the present contribution to the art may be better appreciated.

BRIEF DESCRIPTION OF THE DRAWINGS

Figures

DETAILED DESCRIPTION OF THE DRAWINGS

Figure 1:
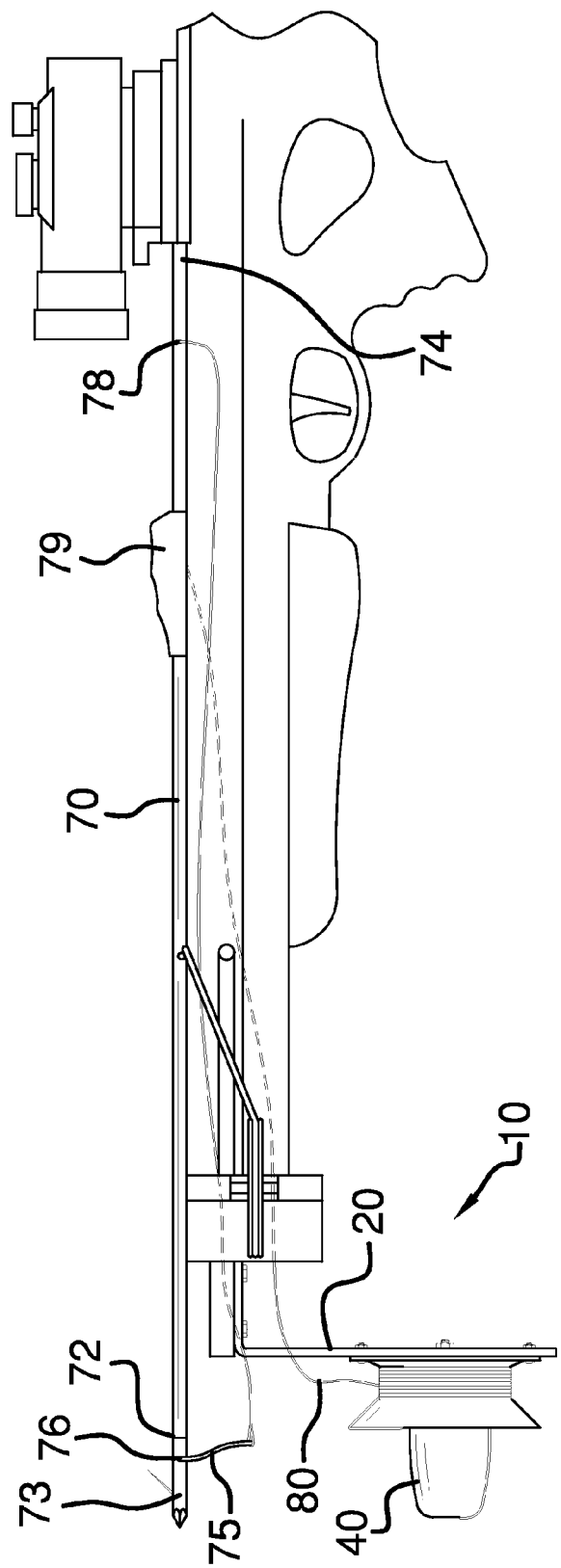
FIG. 1 is a left side elevation view of an aquatic animal retrieval device.
Figure 2:
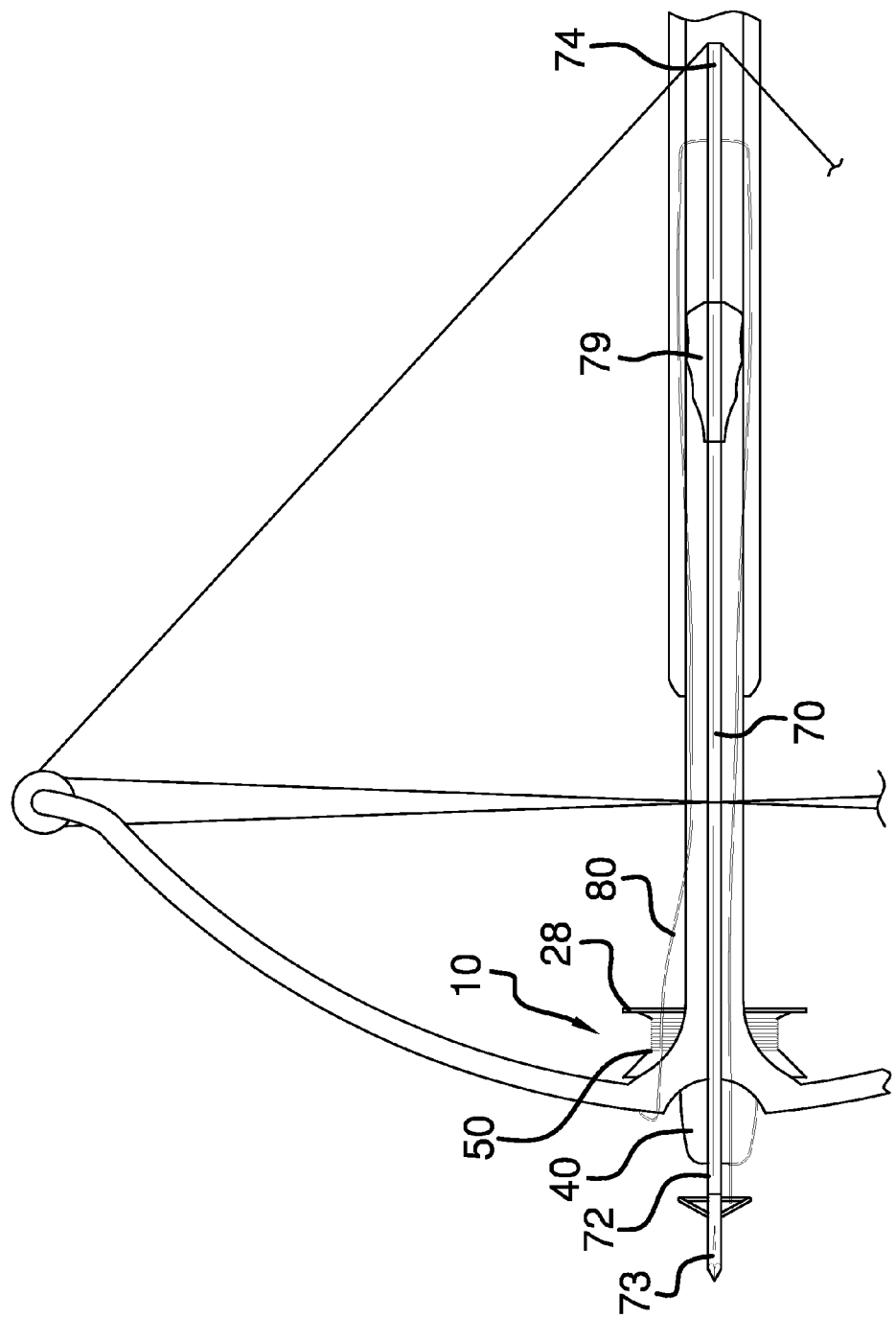
FIG. 2 is a top plan view of the device affixed to a crossbow.
Figure 3:
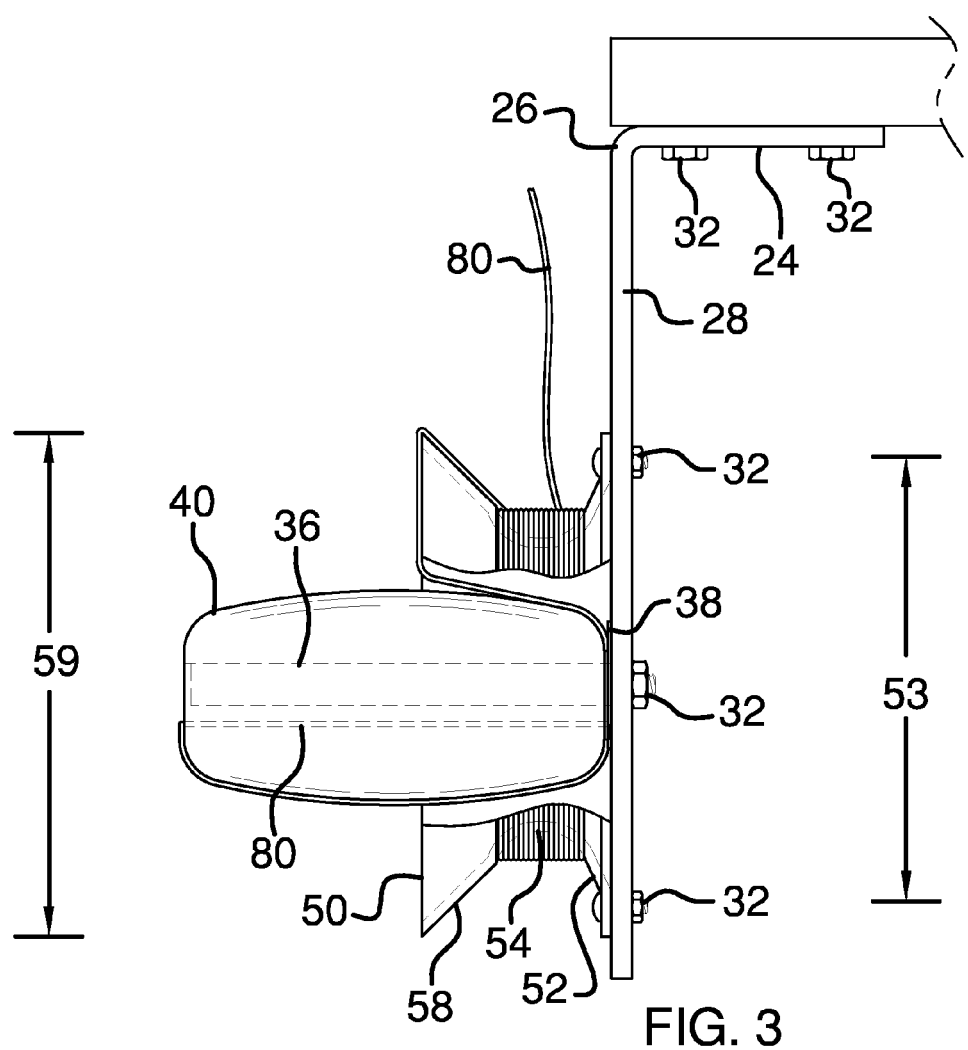
FIG. 3 is a left side elevation view of a mount, a spool and a float of the device.
Figure 4:
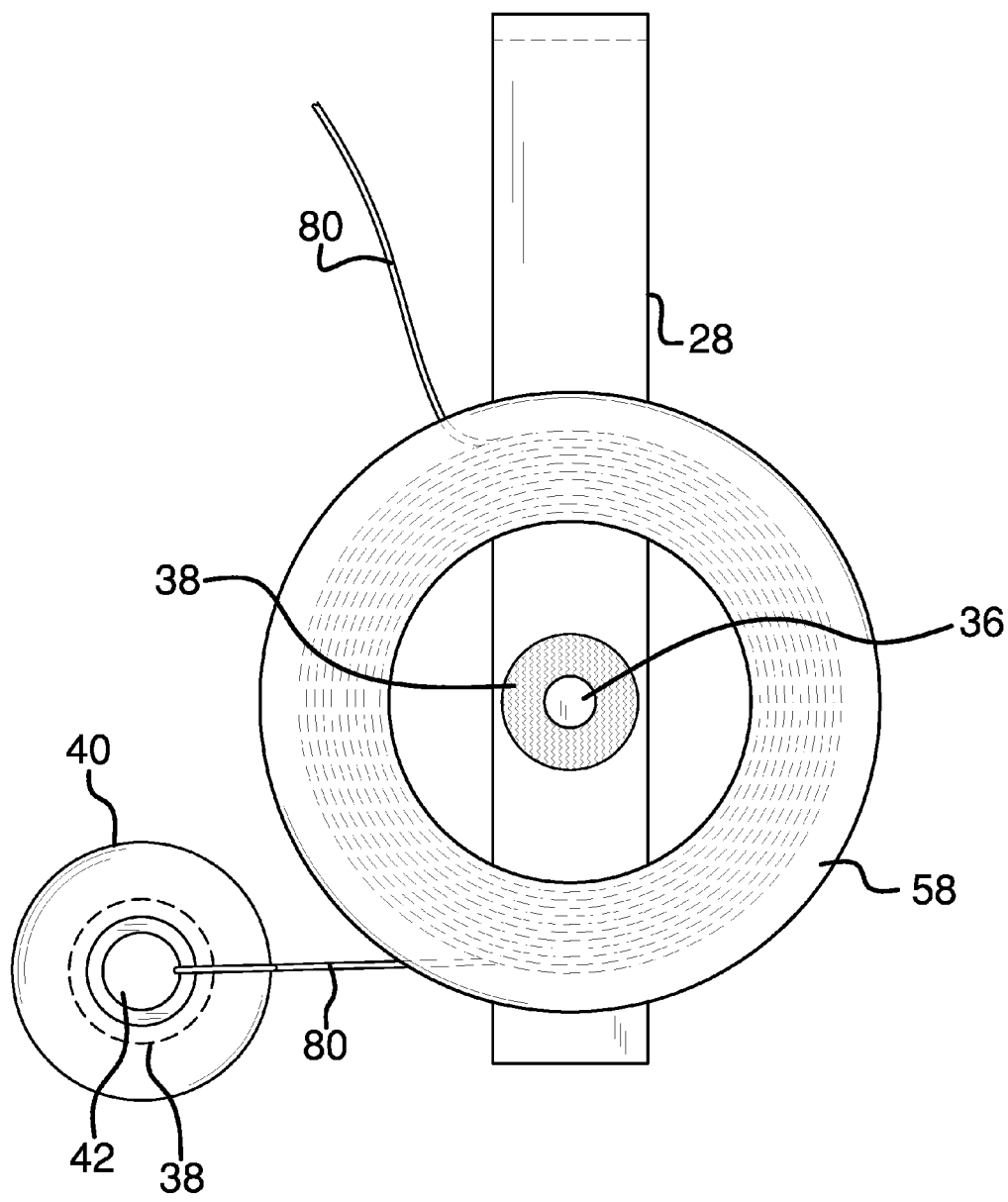
FIG. 4 is a front elevation view of the mount, the spool, the float, and a line of the device, the float removed from a shaft affixed to the lower member of the mount.
Figure 5:
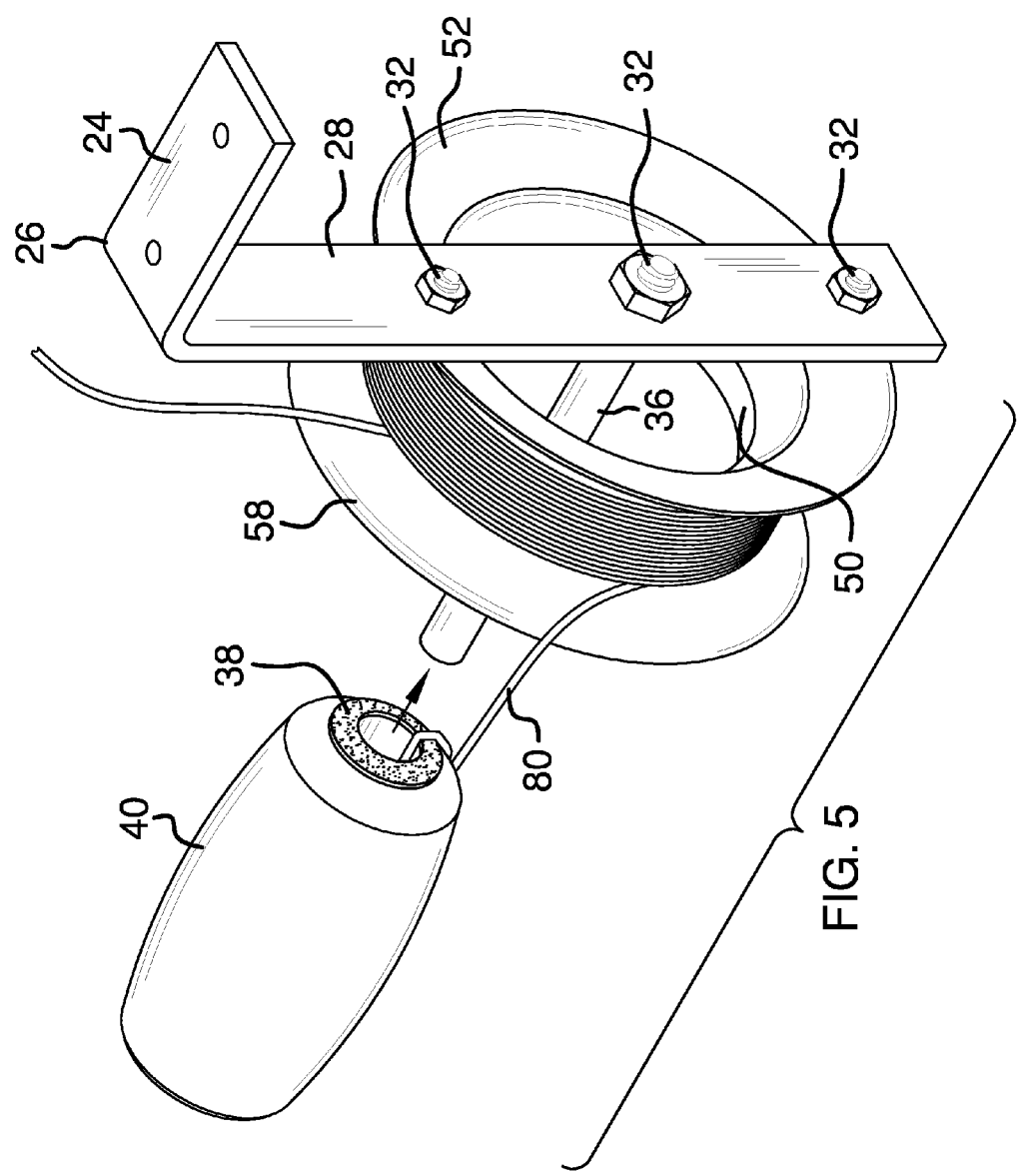
FIG. 5 is left side perspective view of the mount, the spool, the shaft, the line, and the float of the device, the float removed from the shaft.
Figure 6:
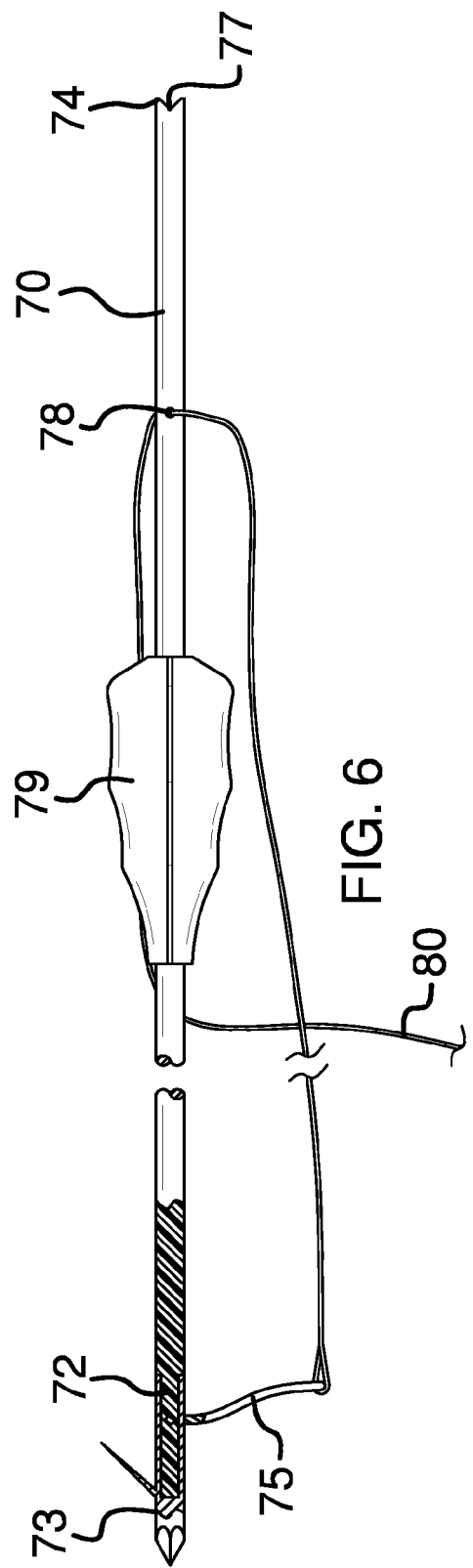
FIG. 6 is top plan view of an arrow and the line.

With reference now to the drawings, and in particular FIGS. 1 through 6 thereof, an example of an aquatic animal retrieval device employing the principles and concepts of the present aquatic animal retrieval device and generally designated by the reference number 10 will be described.

The device 10 includes an L-shaped mount 20 having an upper leg 24 connected to a lower leg 28 by a bend 26. The upper leg 24 is configured for attachment to an existing crossbow via fasteners 32. The V-shaped spool 50 has an inner angle 52 connected to an outer angle 58 by a well 54. The outer angle 58 has an outer angle diameter 59 greater than an inner angle diameter 53 of the inner angle 52. The inner angle 52 is removably attached to the lower leg 28. A shaft 36 is attached perpendicularly to the lower leg 28. The shaft 36 is extended forwardly from the crossbow. A float 40 is provided. The float 40 has a continuous orifice 42 that is slidably disposed on the shaft 36. A hook and loop 38 removably attaches the float 40 to the lower leg 28.

An arrow 70 is provided. The arrow 70 is removably disposed in the crossbow. The arrow 70 comprises a first end 72 spaced apart from a second end 74. A barbed point 73 is disposed on the first end 72. A notch 77 is disposed in the second end 74. The notch 77 is configured to removably accept a drawstring of the crossbow. A loop 75 is disposed within the first end 72 and the barbed point 73. An opening 78 is disposed in the arrow 70. The opening 78 is most proximal to the second end 74. A fletch 79 is disposed in the arrow 70. The fletch 79 is disposed most proximal to the opening 78. The fletch 79 is disposed between the opening 78 and the first end 72.

A line 80 is passed through the orifice 42 and anchored to float 40. The line 80 is releasably wrapped around the well 54. The line 80 is passed through the opening 78 and anchored to the loop 75. The float 40 is configured to remain with the arrow 70 upon release from the crossbow.

What is claimed is:

1. An aquatic animal retrieval device comprising:
   an L-shaped mount, the mount having an upper leg, a lower leg, and a bend disposed between the upper leg and the lower leg, the upper leg attached to a crossbow;
   a V-shaped spool having an inner angle connected to an outer angle by a well, the inner angle removably attached to the lower leg;
   a shaft attached perpendicularly to the lower leg, the shaft extended forwardly from the crossbow;
   a float having an orifice, the orifice slidably disposed on the shaft;
   a hook and loop fastener removably attaching the float to the lower leg;
   an arrow removably disposed in the crossbow, the arrow comprising a first end spaced apart from a second end;
   a barbed point disposed on the first end;
   a notch disposed in the second end, the notch configured to removably receive a drawstring of the crossbow;
   a loop disposed proximal to the first end;
   an opening disposed in the arrow, the opening most proximal to the second end;
   a fletch disposed in the arrow, the fletch disposed most proximal to the opening; and
   a line engaging the orifice and attached to the float, the line releasably wrapped around the well, the line further engaging the opening and attached to the loop;
   wherein the float is configured to travel with the arrow upon release of the arrow from the crossbow.

2. The device of claim 1 wherein the loop is attached to the barbed point.

3. The device of claim 1 wherein the loop is attached to the barbed point and to the first end.

4. The device of claim 1 wherein the fletch is disposed between the opening and the first end.

5. The device of claim 2 wherein the fletch is disposed between the opening and the first end.

6. The device of claim 2 wherein the loop is attached to the barbed point and to the first end.

7. An aquatic animal retrieval device comprising:
   an L-shaped mount, the mount having an upper leg, a lower leg, and a bend disposed between the upper leg and the lower leg, the upper leg attached to a crossbow;
   a V-shaped spool having an inner angle connected to an outer angle by a well, the outer angle having an outer angle diameter greater than an inner angle diameter of the inner angle, the inner angle removably attached to the lower leg;
   a shaft attached perpendicularly to the lower leg, the shaft extended forwardly from the crossbow;
   a float having an orifice, the orifice slidably disposed on the shaft;
   a hook and loop fastener removably attaching the float to the lower leg;
   an arrow removably disposed in the crossbow, the arrow comprising a first end spaced apart from a second end;
   a barbed point disposed on the first end;
   a notch disposed in the second end, the notch configured to removably receive a drawstring of the crossbow;
   a loop disposed within the first end and the barbed point;
   an opening disposed in the arrow, the opening most proximal to the second end;
   a fletch disposed in the arrow, the fletch disposed most proximal to the opening, the fletch disposed between the opening and the first end; and
   a line, the line passed through the orifice and anchored to the float, the line wrapped around the well, the line passed through the opening and anchored to the loop;
   wherein the float is configured to travel with the arrow upon release of the arrow from the crossbow.

* * * * *